(12) United States Patent
Helwani et al.

(10) Patent No.: US 10,901,063 B2
(45) Date of Patent: Jan. 26, 2021

(54) LOCALIZATION ALGORITHM FOR SOUND SOURCES WITH KNOWN STATISTICS

(71) Applicant: Huawei Technologies Duesseldorf GmbH, Duesseldorf (DE)

(72) Inventors: Karim Helwani, Munich (DE); Kainan Chen, Munich (DE); Juergen Geiger, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 107 days.

(21) Appl. No.: 16/014,383

(22) Filed: Jun. 21, 2018

(65) Prior Publication Data
US 2018/0299527 A1 Oct. 18, 2018

Related U.S. Application Data (63) Continuation of application No. PCT/EP2015/080972, filed on Dec. 22, 2015.

(51) Int. Cl.
*G01S 3/80* (2006.01)
*G10L 21/028* (2013.01)
(Continued)

(52) U.S. Cl.
CPC .......... *G01S 3/8006* (2013.01); *G01S 3/8083* (2013.01); *G01S 3/8086* (2013.01); *G10L 17/02* (2013.01);
(Continued)

(58) Field of Classification Search
CPC .......... G01S 3/80; G01S 3/808; G01S 3/8006; G01S 3/8083; G01S 3/8086; G10L 17/02;
(Continued)

(56) References Cited

U.S. PATENT DOCUMENTS 9,219,972 B2 * 12/2015 Vilermo ................. H04S 3/008
9,966,088 B2 * 5/2018 Mysore ................. G10L 21/028
(Continued)

FOREIGN PATENT DOCUMENTS

WO 2007025680 A2 3/2007
WO 2014147442 A1 9/2014

OTHER PUBLICATIONS

Thomson et al., "A matched-field backpropagation algorithm for source localization", OCEANS'97.MTS/IEEE Conference Proceedings, XP010246314, Institute of Electrical and Electronics Engineers, New York, New York (1997).
(Continued)

*Primary Examiner* — Hovhannes Baghdasaryan
*Assistant Examiner* — Amie M Ndure
(74) *Attorney, Agent, or Firm* — Leydig, Voit & Mayer, Ltd.

(57) ABSTRACT

The proposed method for localizing a target sound source from a plurality of sound sources, wherein a multi-channel recording signal of the plurality of sound sources comprises a plurality of microphone channel signals, comprises converting each microphone channel signal into a respective channel spectrogram in a time-frequency domain, blindly separating the channel spectrograms to obtain a plurality of separated source signals, identifying, among the plurality of separated source signals, the separated source signal that best matches a target source model, estimating, based on the identified separated source signal, a binary mask reflecting where the target sound source is active in the channel spectrograms in terms of time and frequency, applying the binary mask on the channel spectrograms to obtain masked channel spectrograms, and localizing the target sound source from the plurality of sound sources based on the masked channel spectrograms.

13 Claims, 6 Drawing Sheets

US 10,901,063 B2
Page 2

(51) Int. Cl.
*G01S 3/808* (2006.01)
*H04R 1/40* (2006.01)
*G10L 17/02* (2013.01)
*G10L 25/18* (2013.01)
*H04R 3/00* (2006.01)
*G10L 25/78* (2013.01)

(52) U.S. Cl.
CPC ............ *G10L 21/028* (2013.01); *G10L 25/18* (2013.01); *H04R 1/406* (2013.01); *G10L 2025/783* (2013.01); *H04R 3/005* (2013.01)

(58) Field of Classification Search
CPC . G10L 21/028; G10L 25/18; G10L 2025/783; H04R 1/406; H04R 3/005
See application file for complete search history.

(56) References Cited

U.S. PATENT DOCUMENTS

| | | | | |
|---|---|---|---|---|
| 2009/0268962 | A1* | 10/2009 | Fearon | G06K 9/624 382/168 |
| 2010/0111313 | A1 | 5/2010 | Namba et al. | |
| 2013/0051569 | A1 | 2/2013 | Nakadai et al. | |
| 2013/0272548 | A1* | 10/2013 | Visser | G06K 9/00624 381/122 |
| 2014/0328487 | A1 | 11/2014 | Hiroe | |
| 2015/0006168 | A1* | 1/2015 | Mysore | G10L 25/84 704/233 |
| 2015/0139433 | A1* | 5/2015 | Funakoshi | H04R 3/04 381/71.1 |
| 2015/0243284 | A1* | 8/2015 | Guo | G10L 15/20 704/233 |

OTHER PUBLICATIONS

Pavlidi et al.,"Real-Time Multiple Sound Source Localization and Counting Using a Circular Microphone Array", IEEE Transactions on Audio, Speech and Language Processing, IEEE Service Center vol. 21, No. 10, XP011521588, Institute of Electrical and Electronics Engineers, New York, New York (Oct. 2013).
Schmidt "Multiple Emitter Location and Signal Parameter Estimation," IEEE Transactions on Antennas and Propagation, vol. AP-34, No. 3, Institute of Electrical and Electronics Engineers, New York, New York (Mar. 1986).
Roy et al, "ESPRIT—Estimation of Signal Parameters Via Rotational Invariance Techniques," IEEE Transactions on Acoustics. Speech. and Signal Processing. vol. 37. No. 7. Institute of Electrical and Electronics Engineers, New York, New York (Jul. 1989).
Teutsch et al, "EB-ESPRIT: 2D Localization of Multiple Wideband Acoustic Sources Using Eigen-Beams," Proceedings. (ICASSP "05). IEEE International Conference on Acoustics, Speech, and Signal Processing, 2005, Institute of Electrical and Electronics Engineers, New York, New York (2005).
Knapp et al, "The generalized correlation method for estimation of time delay," IEEE Transactions on Acoustics, Speech, and Signal Processing, vol. ASSP-24, No. 4, Institute of Electrical and Electronics Engineers, New York, New York (Aug. 1976).
Dibiase, "A High-Accuracy, Low-Latency Technique for Talker Localization in Reverberant Environments Using Microphone Arrays,"
PhD thesis, Brown University, Providence, Rhode Island, (May 2000).
Buchner et al, "Trinicon: A Versatile Framework for Multichannel Blind Signal Processing," 2004 IEEE International Conference on Acoustics, Speech, and Signal Processing, Institute of Electrical and Electronics Engineers, New York, New York (2004).
Benesty "Adaptive eigenvalue decomposition algorithm for passive acoustic source localization," J. Acoust. Soc. Am. 107 (1), (Jan. 2000).
Omologo et al, "Acoustic Source Location in Noisy and Reverberant Environment Using CSP Analysts," Acoustics, Speech, and Signal Processing, 1996, ICASSP-96, Conference Proceedings, 1996 IEEE International Conference on vol. 2. IEEE, Institute of Electrical and Electronics Engineers, New York New York (1996).
Blandin et al, "Multi-source TDOA estimation in reverberant audio using angular spectra and clustering," Signal Processing, Elsevier, (2012).
Ribeiro et al, "Using Reverberation to Improve Range and Elevation Discrimination for Small Array Sound Source Localization," IEEE Transactions on Audio, Speech, and Language Processing, vol. 18, No. 7, Institute of Electrical and Electronics Engineers, New York New York (Sep. 2010).
Nam et al, "Physics-Driven Structured Cosparse Modeling for Source Localization," 2012 IEEE International Conference on Acoustics, Speech and Signal Processing (ICASSP), Institute of Electrical and Electronics Engineers, New York, New York (2012).
Brandstein et al, "A practical methodology for speech source localization with microphone arrays," Computer Speech and Language (1997).
Casey et al, "Separation of Mixed Audio Sources by Independent Subspace Analysis," TR2001-31, Proceedings of the International Computer Music Conference, Berlin, Mitsubishi Electric Research Laboratories Inc, (2001).
Cho et al, "Robust Sound Source Localization using a Wiener Filter," IEEE, Institute of Electrical and Electronics Engineers, New York, New York (2013).
Nesta et al, "Cumulative State Coherence Transform for a Robust Two-Channel Multiple Source Localization," ICA 2009, LNCS 5441, pp. 290-297, (2009).
Ganchev et al, "Comparative Evaluation of Various MFCC Implementations on the Speaker Verification Task," in Proc. of the SPECOM-2005, (2005).
Hermansky et al., "Perceptual linear predictive(PLP) analysis of speech," J. Acoust. Soc.Am. 87(4), (Apr. 1990).
Kinnunen et al, "An overview of text-independent speaker recognition: From features to supervectors," Speech Communication 52, Elsevier (2010).
Lee et al, "Algorithms for Non-negative Matrix Factorization," Proceeding NIPS"00 Proceedings of the 13th International Conference on Neural Information Processing Systems, (2000).
Lombard et al, "TDOA Estimation for Multiple Sound Sources in Noisy and Reverberant Environments Using Broadband Independent Component Analysis," IEEE Transactions on Audio, Speech, and Language Processing, vol. 19, No. 6, Institute of Electrical and Electronics Engineers, New York, New York (Aug. 2011).
Spriet et al., "Spatially pre-processed speech distortion weighted multi-channel Wiener filtering for noise reduction," Published in Signal Processing, vol. 84, No. 12, pp. 2367-2387, (Dec. 2004).
McLachlan et al., "clustering via normal mixture models," Proc. Am. Stat. Assoc, (1997).

* cited by examiner

LOCALIZATION ALGORITHM FOR SOUND SOURCES WITH KNOWN STATISTICS

CROSS-REFERENCE TO RELATED APPLICATIONS

This application is a continuation of International Application No. PCT/EP2015/080972, filed on Dec. 22, 2015, the disclosure of which is hereby incorporated by reference in its entirety.

TECHNICAL FIELD

Embodiments of the present disclosure relate to the general field of audio signal processing. In particular, this disclosure relates to a method of sound source localization using microphone arrays.

BACKGROUND

The state of the art comprises algorithms that localize multiple active sources together, such as Time Difference Of Arrival (TDOA) and Direction Of Arrival (DOA). However, when considering the problem of localizing a single specified sound source with multiple sound sources active together, such as localizing the sound of a given person while this given person is talking with two other people, most of these algorithms can only tell the result of all of their locations without knowing which location belongs to that given person or speaker.

The known main microphone array localization algorithms can be categorized as DOA and TDOA estimations.

With respect to DOA, there are many eigen-based algorithms such as MUltiple SIgnal Classification (MUSIC), see R. O. Schmidt, Multiple emitter location and signal parameter estimation, Antennas and Propagation, IEEE Transactions, 34(3):276-280, March 1986, or Estimation of Signal Parameter via Rotational Invariance Technique (ESPRIT), see R. Roy and T. Kailath, Esprit-estimation of signal parameters via rotational invariance techniques, Acoustics, Speech and Signal Processing, IEEE Transactions, 37(7): 984-995, July 1989, as well as several algorithms based thereon like Eigen-Beam Processing for DOA Estimation using Spherical Apertures, see Teutsch, H and Kellermann, W. EB-ESPRIT: 2D localization of multiple wideband acoustic sources using eigen-beams, Acoustics, Speech, and Signal Processing, 2005, Proceedings, (ICASSP '05), IEEE International Conference, 3:89-92, March 2005.

With respect to TDOA estimation algorithms, General Correlation Coefficient (GCC) with PHAse Transform (PHAT) is a popular algorithm for estimating the signal arrival time difference between microphones, see C. Knapp and G. Cliord Carter, The generalized correlation method for estimation of time delay, Acoustics, Speech and Signal Processing, IEEE Transactions, 24:320-327, August 1976. Its further development, which is called Steered Response Power with PHAse Transform (SRP-PHAT) is widely implemented, see Joseph Hector DiBiase, A High-Accuracy, Low-Latency Technique for Talker Localization in Reverberant Environments Using Microphone Arrays, PhD thesis, Brown University, May 2000.

Beside GCC, there are also algorithms that compute the impulse response between each microphone and each source. A first of these algorithms referred to as Buchner-algorithm is described in H. Buchner, R. Aichner, and Walter Kellermann, Trinicon: a versatile framework for multichannel blind signal processing, Acoustics, Speech, and Signal Processing, 2004, Proceedings, IEEE International Conference, 3:iii-889-92, May 2004. A second of these algorithms referred to as Benesty-algorithm is described in Jacob Benesty, Adaptive eigenvalue decomposition algorithm for passive acoustic source localization, The Journal of the Acoustical Society of America, 107:384, September 1999.

The generalized cross-correlation is typically used where the peak location of the cross-correlation function of the signal of two microphones is mapped to an angular spectrum for DOA estimation, see Knapp, Charles H., and G. Clifford Carter, "The generalized correlation method for estimation of time delay", Acoustics, Speech and Signal Processing, IEEE Transactions on 24.4 (1976): 320-327.

A weighting scheme is often employed to increase the robustness of this approach to noise and multi-path effect. Maximum likelihood estimation of the weights has been considered as an optimal approach in the presence of uncorrelated noise, while the phase transform has been shown to be effective to overcome reverberation ambiguities, see Omologo, Muurizio, and Piergiorgio Svaizer, "Acoustic source location in noisy and reverberant environment using CSP analysis", Acoustics, Speech, and Signal Processing, 1996, ICASSP-96, Conference Proceedings, 1996 IEEE International Conference on Vol. 2. IEEE, 1996, and Blandin, Charles, Alexey Ozerov, and Emmanuel Vincent, "Multi-source TDOA estimation in reverberant audio using angular spectra and clustering", Signal Processing 92.8 (2012): 1950-1960.

In addition, identification of the speaker-microphone acoustic channel has been incorporated for TDOA estimation and reverberant speech localization, see Ribeiro, Flavio, et al., "Using reverberation to improve range and elevation discrimination for small array sound source localization", Audio, Speech, and Language Processing, IEEE Transactions on 18.7 (2010): 1781-1792, as well as Nam, Sangnam, and Rémi Gribonval, "Physics-driven structured cosparse modeling for source localization", Acoustics, Speech and Signal Processing (ICASSP), 2012 IEEE International Conference on, IEEE, 2012.

Although TDOA-based techniques are practical and robust, they do not offer a high update rate as the short-frame correlations are susceptible to the spurious peaks caused by reverberation, see Brandstein, Michael S., and Harvey F. Silverman, "A practical methodology for speech source localization with microphone arrays", Computer Speech & Language 11.2 (1997): 91-126.

However, from all the algorithms mentioned above, most of them do not work for specified sound source localization. Further on, the above-mentioned Buchner-algorithm does not work on multi-source localization.

Only the above-mentioned Benesty-algorithm offers the possibility to provide both sound source information and TDOA information together. However, this algorithm is designed for Blind Source Separation (BSS), and the number of sources needs to be known. Further, it is necessary to have less than three sources, and the computational complexity of the method is high. With respect to localization quality, the Benesty-algorithm bases on a convergence problem. However, when the scenario has low Signal-Noise Ratio (SNR) of diffuse noise, the BSS result may still be good, but the TDOA result cannot be guaranteed.

SUMMARY

In view of the above-mentioned disadvantages and problems, the present disclosure aims to improve the state of the art. In particular, an object of the present disclosure is to provide an apparatus and a method, respectively, which allows improving sound source localization using microphone arrays.

Further embodiments of the present disclosure also intend to improve the problem of underdetermined source localization or source separation. An underdetermined localization problem has to be solved when the number of sources is greater than the number of channels of a recorded multi-channel signal, i.e. the number of sources is greater than the number of microphones used for recording the sources.

Also, the present disclosure proposes to improve the state of the art source localization in that it is not necessary to know in advance the number of microphones used for recording the sources.

The above-mentioned object of the present disclosure is achieved by the solution provided in the enclosed independent claims. Advantageous implementations of the present disclosure are further defined in the respective dependent claims.

A first aspect of the present disclosure provides an apparatus for localizing a target sound source from a plurality of sound sources. A multi-channel recording signal of the plurality of sound sources comprises a plurality of microphone channel signals. The apparatus comprises a converting unit adapted to convert each microphone channel signal into a respective channel spectrogram in a time-frequency domain. The apparatus comprises a blind source separation unit adapted to blindly separate the channel spectrograms to obtain a plurality of separated source signals. The apparatus comprises an identification unit adapted to identify, among the plurality of separated source signals, a separated source signal that best matches a target source model. The apparatus comprises an estimation unit adapted to estimate, based on the identified separated source signal, a binary mask reflecting where the target sound source is active in the channel spectrograms in terms of time and frequency. The apparatus comprises a masking unit adapted to apply the binary mask on the channel spectrograms to obtain masked channel spectrograms. The apparatus comprises a localization unit adapted to localize the target sound source from the plurality of sound sources based on the masked channel spectrograms.

Thereby, the present disclosure is advantageous in that an underdetermined source localization problem may be solved. Instead of trying to solve such an underdetermined localization problem, the binary mask applied to the channel spectrograms according to the disclosure indeed reduces an underdetermined localization problem to a determined or overdetermined source localization problem, in which only one specified target source has to be localized.

Further, the present disclosure is advantageous in that it is not necessary to know the localization algorithm in advance the number of active sources.

In a first implementation form of the apparatus according to the first aspect, the target sound source is considered to be active in a given time-frequency slot of the channel spectrograms if its energy in the given time-frequency slot of the channel spectrograms is sufficiently large in relation to the total energy of the channel spectrograms.

Thereby, it may be possible to estimate the binary mask reflecting where the target sound source is active, so that the localization problem in fact consists in a determined or overdetermined source localization problem. For a given time-frequency slot, the energy of the target sound source may be sufficiently large if it is above a fraction of the total energy of the channel spectrograms, wherein the fraction may be defined by the total energy of the channel spectrograms multiplied by a threshold, wherein the threshold may be predefined.

In a second implementation form of the apparatus according to the first aspect, the apparatus comprises an averaging unit adapted to average the channel spectrograms into an averaged channel spectrogram. The blind source separation unit is adapted to blindly separate the averaged channel spectrogram to obtain the plurality of separated source signals.

Thereby, the blind source separation may be performed on a single spectrogram. The averaging unit is optional since, alternatively, the blind source separation may also be performed directly on the channel spectrograms.

In a third implementation form of the apparatus according to the first aspect, the apparatus comprises a block segmentation unit adapted to segment the microphone channel signals into blocks. The converting unit is adapted to convert each microphone channel signal into the respective channel spectrogram in the time-frequency domain by converting each block into the respective channel spectrogram by means of a short-time Fourier transform, STFT. The estimation unit is adapted to estimate the binary mask in that the element $V'_{ij}$ of the binary mask is defined as:

$$V'_{ij} = \begin{cases} 1, & \psi_{ij} > \tau V_{ij}, \\ 0, & \text{otherwise} \end{cases} \quad i = 1, \ldots N, j = 1, \ldots F.$$

wherein
N is a length of the STFT,
F is a number of frames comprised in each block,
$\psi$ is the identified separated source signal,
$\tau$ is a threshold, and
V is the averaged channel spectrogram.

Thereby, the binary mask may be advantageously computed. The threshold $\tau$ may be predefined or may be adaptively set. The value of the threshold may be comprised between 0.3 and 0.5. In block-based processing, such as real-time processing, there are only a few frames which can be analyzed together. It is proposed to select $\tau > 0.3$ to guarantee that there is enough information for the localization. It is not necessary for the specified source to be predominant. Accordingly, it is proposed to set the threshold $\tau$ not higher than 0.5, otherwise there would be too much useful information wasted.

In a fourth implementation form of the apparatus according to the first aspect, the localization unit is adapted to localize the target sound source by localizing, from the plurality of sound sources, the sound source having a contribution in terms of energy to the plurality of sound sources in the masked channel spectrograms that is similar to the energy relation of the target sound source in relation to the total energy of the plurality of sound sources.

In a fifth implementation form of the apparatus according to the first aspect, the localization unit comprises a separation unit adapted to separate the masked channel spectrograms into narrow frequency bands, and each masked channel spectrogram into corresponding narrow band channel spectrograms. The localization unit comprises a computing unit adapted to, for each narrow frequency band, compute a covariance of a narrow band spectrogram comprising the narrow band channel spectrograms of all channels, decompose the covariance into its eigenvalues and eigenvectors, compute the energy of each eigenvalue, the sum of the energy of all eigenvalues, and the corresponding energy ratio of each eigenvalue, estimate the averaged signal-to-noise ratio, SNR, through all frames in said narrow frequency band of the averaged spectrogram, and choose, from among all eigenvalues, the eigenvalue that has the energy ratio that is the most similar to the averaged SNR. The localization unit comprises an ESPRIT localization unit adapted to localize the target sound source from the plurality of sound sources based on the chosen eigenvalue by means of an ESPRIT algorithm.

In a sixth implementation form of the apparatus according to the first aspect, the ESPRIT localization unit is adapted to estimate a localization, i.e. a DOA, of the target sound source for each narrow frequency band. The computing unit is adapted to collect the estimated localizations in a histogram and to localize the target sound source by means of a peak detection on the histogram.

In a seventh implementation form of the apparatus according to the first aspect, the identification unit adapted to identify, among the plurality of separated source signals, the separated source signal that best matches the target source model comprises an extraction unit adapted to extract audio features from each of the separated source signals, and a sub-identification unit adapted to identify, from among the separated source signals, the separated source signal corresponding to the audio features that best match the target source model.

Particularly, the extracted audio features may be Mel-Frequency Cepstrum Coefficients, MFCCs. These audio features are particularly adapted to cases where the signals are speech signals, i.e. cases where the multi-channel recording signal comprises a speech signal generated by the target sound source.

Particularly, the extracted audio features may be MFCCs, and the training unit may be adapted to train the target source model by modeling the MFCC features by means of a Gaussian Mixture Model, GMM. The use of such a MFCC-GMM approach is advantageous for speaker identification, i.e. for specific embodiments with the signals from the target sound source being speech signals.

Particularly, the sub-identification unit may be adapted to identify, from among the separated source signals, the separated source signal corresponding to the audio features that best match the target source model by means of a maximum-likelihood classification or minimum-distance classification.

In an eighth implementation form of the apparatus according to the first aspect, the blind source separation unit is adapted to blindly separate the channel spectrograms to obtain a plurality of separated source signals, by factorizing the channel spectrograms by means of a non-negative matrix factorization, NMF, into bases and activations, the bases and activations corresponding to the separated source signals.

In a ninth implementation form of the apparatus according to the first aspect, the identification unit adapted to identify, among the plurality of separated source signals, the separated source signal that best matches the target source model comprises an extraction unit adapted to extract audio features from each of the bases, and a sub-identification unit adapted to identify, from among the bases, the basis corresponding to the audio features that best match the target source model, and the activation corresponding to the identified basis. The identified separated source signal is defined as $\psi = W_s * H_s$, $W_s$ and $H_s$ being respectively the identified basis and the identified activation.

In a tenth implementation form of the apparatus according to the first aspect, the blind source separation unit is adapted to blindly separate the channel spectrograms to obtain a plurality of separated source signals by means of a subspace analysis.

Particularly, the selection unit may be adapted to select the separated signal that best matches the target model by means of pattern recognition.

In an eleventh implementation form of the apparatus according to the first aspect, the apparatus comprises a training unit adapted to train the target model based on at least one training recording signal of the target sound source. The training unit comprises an extraction unit adapted to extract audio features from the at least one training recording signal, and a training unit adapted to train the target model based on the extracted audio features.

A second aspect of the present disclosure provides a system comprising an apparatus according to the first aspect of the present disclosure, and at least one microphone array for recording the multi-channel recording signal. The localization unit of the apparatus is adapted to localize the target sound source by determining a direction of arrival, DOA, of the target sound source with respect to the microphone array.

A third aspect of the present disclosure provides a method for localizing a target sound source from a plurality of sound sources. A multi-channel recording signal of the plurality of sound sources comprises a plurality of microphone channel signals. The method comprises converting each microphone channel signal into a respective channel spectrogram in a time-frequency domain. The method comprises blindly separating the channel spectrograms to obtain a plurality of separated source signals. The method comprises identifying, among the plurality of separated source signals, the separated source signal that best matches a target source model. The method comprises estimating, based on the identified separated source signal, a binary mask reflecting where the target sound source is active in the channel spectrograms in terms of time and frequency. The method comprises applying the binary mask on the channel spectrograms to obtain masked channel spectrograms. The method comprises localizing the target sound source from the plurality of sound sources based on the masked channel spectrograms.

Further features or implementations of the method according to the third aspect of the disclosure can perform the functionality of the apparatus according to the first aspect of the disclosure and its different implementation forms.

A fourth aspect of the present disclosure provides a computer program having a program code for performing the method according to the third aspect of the present disclosure, when the computer program runs on a computing device.

The training of the target source model is typically done before the localization phase e.g. in an offline phase, and only needs to be run once. In the localization phase, the multi-channel recording signal is first converted or transformed into frequency domain in frames by e.g. a Short Time Fourier Transformation, STFT. By the analysis of the STFT result, the useful frequency bands in the frames in which the source is active are taken, by applying a binary mask, into the localization algorithm to estimate the DOA, which is the localization result. The analysis part of the localization system comprises the blind source separation unit, the identification unit, and the estimation unit, and uses e.g. the algorithm Nonnegative Matrix Factorization, NMF, to perform blind source separation of the recording.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above aspects and implementation forms of the present disclosure will be explained in the following description of specific embodiments in relation to the enclosed drawings, in which.

DETAILED DESCRIPTION OF EMBODIMENTS

Figure 1:
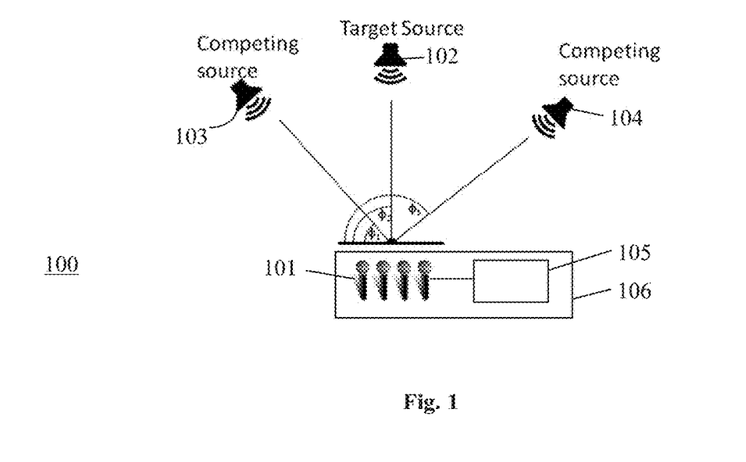
FIG. 1 shows a system according to an embodiment of the present disclosure.

FIG. 1 shows a system 100 according to an embodiment of the present disclosure.

The system 100 comprises a localization system 106 according to the present disclosure, as well as a target source 102 and two competing sound sources 103, 104. The system 100 comprises three sound sources that are active sound sources, and preferably simultaneously active sound sources.

The localization system 106 comprises an apparatus 105 for localizing the target sound source 102 from the plurality of sound sources 102, 103, 104 that includes the target source 102 and the competing sound sources 103, 104. The localization system 106 further comprises a microphone array 101 for recording a multi-channel recording signal of the plurality of sound sources 102, 103, 104. Instead of the microphone array 101, the localization system may comprise several microphone arrays adapted to record the multi-channel recording signal.

The apparatus 105 is adapted to localize the target sound source 102 by determining a direction of arrival, DOA, $\Phi_2$ of the target sound source 102 with respect to the microphone array 101. FIG. 1 further shows respective directions of arrival $\Phi_1$, $\Phi_3$ of the competing sound sources 103, 104.

The present disclosure proposes to use the microphone array 101 to localize one of the sound sources that is the target sound source 102 from among the plurality of sound sources, e.g. from among the three sound sources. The other two sound sources are considered as competing sources when localizing the target sound source 102 and are correspondingly referred to as the competing sound sources 103, 104.

The microphone array 101 comprises several microphones. The microphone array 101 is adapted to record the target source 102 and the two competing sound sources 103, 104, and particularly to record at least the target sound source 102. The microphone array 101 may be made up of e.g. known omnidirectional microphones and/or directional microphones. The microphone array 101 may comprise closely spaced, e.g. adjacent, microphones and/or may comprise microphones distributed in the system 100. The microphone array 101 may comprise an arrangement of several sub-microphone arrays.

Figure 2:
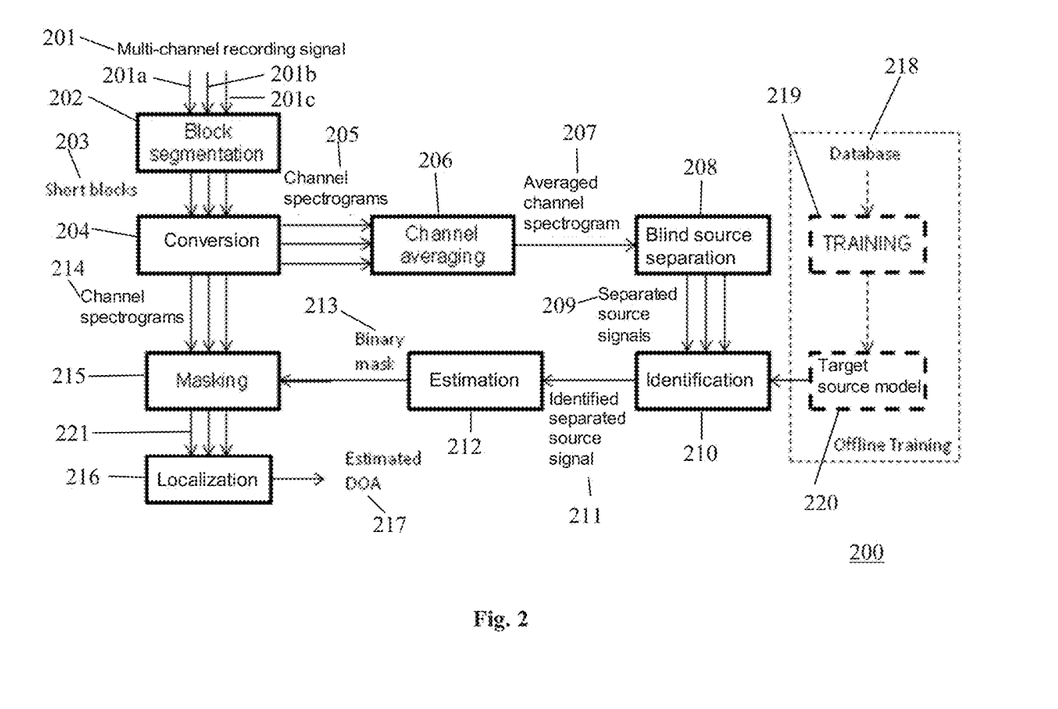
FIG. 2 shows an apparatus for localizing a target sound source according to an embodiment of the present disclosure.

FIG. 2 shows an apparatus 200 for localizing the target sound source according to an embodiment of the present disclosure. The apparatus 200 may be an embodiment of the apparatus 105 of FIG. 1.

The apparatus 200 is adapted to localize the target sound source 102 from the plurality of sound sources 102, 103, 104. A multi-channel recording signal 201 of the plurality of sound sources 102, 103, 104 comprises a plurality of microphone channel signals 201a, 201b, 201c.

The apparatus comprises a converting unit 204 adapted to convert each microphone channel signal 201a, 201b, 201c into a respective channel spectrogram 205, 214 in a time-frequency domain.

The apparatus comprises a blind source separation unit 208 adapted to blindly separate the channel spectrograms 205 to obtain a plurality of separated source signals 209.

The apparatus comprises an identification unit 210 adapted to identify, among the plurality of separated source signals 209, the separated source signal 211 that best matches a target source model 220.

Particularly, identifying the separated source signal 211 that best matches the target source model 220 is a pattern recognition problem. Using a pattern recognition algorithm, it is possible to perform a most likely matching of the separated source signals 209 with respect to the target source model 220, so as to identify the separated source signal 211 that most likely matches the target source model 220. For example, a score may be computed for each separated source signal 209, wherein the score indicates the degree of similarity of the separated source signal 209 with the target source model 220. The separated source signal having the best or highest score is identified as the separated source signal 211 that best matches the target source model 220.

The apparatus comprises an estimation unit 212 adapted to estimate, based on the identified separated source signal 211, a binary mask 213 reflecting where the target sound source 102 is active in the channel spectrograms 214 in terms of time and frequency.

The apparatus comprises a masking unit 215 adapted to apply the binary mask 213 on the channel spectrograms 214 to obtain masked channel spectrograms 221.

The apparatus comprises a localization unit 216 adapted to localize the target sound source 102 from the plurality of sound sources 102, 103, 104 based on the masked channel spectrograms 221.

The localization unit 216 of the apparatus 200 is adapted to localize the target sound source 102 by determining a direction of arrival, DOA, $\Phi_2$ of the target sound source 102 with respect to the microphone array 101.

In general, the disclosure can be used in a scenario with a microphone array 101 consisting of several microphones and where multiple sound sources 102, 103, 104 are active. One of the sources is considered to be the target sound source 102 to be localized, while the others are regarded as competing sources. The aim of the disclosure is to localize in terms of DOA the target sound source 102 even when the other sources are active. One particular problem in the case of multiple active sources is that it is difficult to decide which of the DOA estimates belongs to the target sound source 102.

The present disclosure advantageously proposes to apply the binary mask to the channel spectrograms so that an underdetermined localization problem may be reduced to a determined or overdetermined source localization problem, in which only one specified target source has to be localized. To guarantee the accuracy of the localization however, it is suggested to have at least one, or better two more microphones than the number of active sound sources 102, 103, 104.

To distinguish which is the target sound source 102, some information about the target sound source 102 is required, such as statistics information that is known from at least one recording signal 218 stored in a database. The statistics information is, e.g., in the form of a target model 220 that is trained in an offline phase, while the localization of the target sound source 102 is carried out in a subsequent phase or online phase.

In the embodiment of FIG. 1, the plurality of sound sources arrive at the microphone array 101 with respective angles of $\Phi_1=60°$, $\Phi_2=90°$, $\Phi_3=135°$. The localization according to the disclosure is able to identify the DOA of the target source as being $\Phi_2=90°$.

Particularly, the apparatus 200 comprises an averaging unit 206 adapted to average the channel spectrograms 205 into an averaged channel spectrogram 207. The blind source separation unit 208 is adapted to blindly separate the averaged channel spectrogram 207 to obtain the plurality of separated source signals 209. In an alternative embodiment, the averaging unit 206 is not required and the blind source separation unit 208 is adapted to blindly separate the channel spectrograms 205 to obtain the plurality of separated source signals 209.

Particularly, the apparatus 200 comprises a block segmentation unit 202 adapted to segment the microphone channel signals 201a, 201b, 201c into blocks 203. The blocks 203 may be consecutive in time or can overlap. If the blocks 203 overlap, the computation requirements increase but also the robustness of the localization increases.

Particularly, the target source model 220 is trained based on at least one training recording signal 218 of the target sound source 102. The recording signal 218 may be stored in a database. A training unit 219 is adapted to train the target source model 220 based on the at least one training recording signal 218 of the target sound source 102.

Figure 3:
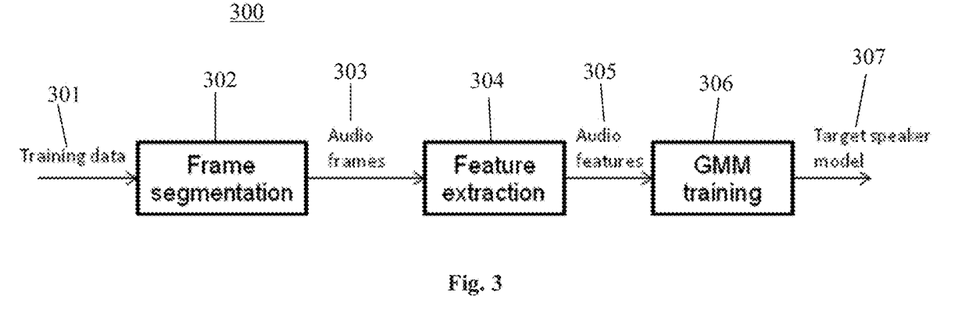
FIG. 3 shows a training unit according to an embodiment of the present disclosure.

FIG. 3 shows a training unit 300 of the apparatus 200 according to an embodiment of the present disclosure.

The training unit 300 is adapted to train the target source model 220, 307 based on the at least one training recording signal 218, 301 of the target sound source 102. The training unit 300 comprises an extraction unit 304 adapted to extract audio features 305 from the at least one training recording signal 301. The training unit 300 comprises a training unit 306 adapted to train the target source model 307 based on the extracted audio features 305.

As the disclosure aims to localize the target sound source 102, source features are needed during the localization processing. Since the properties of speech, the spectrums for different vowels, consonants and pitch of speaking are different, it is suggested to use statistics features to model the target sound source 102.

The one of the common method of statistics features are Mel-Frequency Cepstrum Coefficients (MFCCs). MFCCs are widely used in speech and speaker recognition, and are, e.g., presented in T. Ganchev, N. Fakotakis, and G. Kokkinakis (2005), "Comparative evaluation of various MFCC implementations on the speaker verification task," in 10th International Conference on Speech and Computer (SPECOM 2005), Vol. 1, pp. 191-194. MFCCs may be commonly derived according to the following steps:

1. Taking Fourier Transform of the training recording signals 218, 301,
2. Mapping the spectrum onto the Mel Scale,
3. Taking logs of the powers at each Mel frequency,
4. Taking the Discrete Cosine Transform, DCT, of the log powers, and
5. Obtaining the MFCCs that are the amplitudes of the result.

For speaker modeling, the disclosure proposes to use a classical approach from speaker recognition research. The training recording signals 301 are separated by means of a frame segmentation unit 302 into blocks, also called frames 303, with a duration of 20-30 ms. The audio features 305, like in the present embodiment the MFCCs, are computed for each block. The training unit 306 in the form e.g. of a Gaussian Mixture Model, GMM, is then used to model the MFCC features. The result of the GMM training is the target source model 307.

Particularly, a Gaussian Mixture Model is a probabilistic model which is commonly used in speech recognition. GMMs are usually trained with the expectation maximization, EM, algorithm. Other known mixture models could be used in the present disclosure instead of the GMM. An overview of possible models can be taken from McLachlan, G., ed.: Mixture Models. Marcel Dekker, New York, N.Y. (1988).

The above embodiment uses audio features 305 comprising MFCCs, and a training unit 306 based on GMM. In the case of speech signals as the target signal and competing signals, in general, instead of this MFCC-GMM approach, other features and models could also be used for speaker recognition. For example, instead of the MFCC features, features from perceptive linear predictive, PLP, analysis can also be employed. An overview of such features is given e.g. in Hermansky, Hynek. "Perceptual linear predictive (PLP) analysis of speech." *the Journal of the Acoustical Society of America* 87.4 (1990): 1738-1752.

MFCCs and PLPs are short-term spectral features. Other feature types, such as voice source features, spectro-temporal features (e.g., modulation spectrogram features), prosodic features (e.g., the fundamental frequency f0), and high-level features could also be used. An overview of such features can be taken from Kinnunen, Tomi, and Haizhou Li. "An overview of text-independent speaker recognition: From features to supervectors." *Speech communication* 52.1 (2010): 12-40.

Other pattern recognition methods could be used instead of the GMM, such as vector quantization, VQ, or support vector machine, SVM, which is a discriminative classifier. An overview of possible models and pattern recognition methods known in the field of speaker recognition is given in Kinnunen, Tomi, and Haizhou Li. "An overview of text-independent speaker recognition: From features to supervectors." *Speech communication* 52.1 (2010): 12-40. Furthermore, other modeling techniques can be used in the case that other signals are used instead of speech signals.

With reference to FIG. 2, the converting unit 204 is adapted to convert each microphone channel signal 201a, 201b, 201c into the respective channel spectrogram 205, 214 in the time-frequency domain by converting each block 203 into the respective channel spectrogram 205, 214 by means of a short-time Fourier transform, STFT. Particularly, the converting unit 204 converts each microphone channel signal 201a, 201b, 201c into a matrix of dimension N*F in time-frequency domain, wherein N is the length of the STFT i.e. the length of a Discrete Fourier Transform, DFT, used in the STFT, and F is the number of frames of a block 203. Each frame may have a length of 20-30 ms. For example, the MFCCs mentioned above may be calculated on a frame basis.

The channel spectrogram 205 of the $p_{th}$ channel may be defined as $V_P$, and the averaged channel spectrogram 207 generated by the averaging unit 206 as V. The P matrices $V_1$ to $V_P$ may be averaged to the matrix V according to the equation:

$$V = \frac{1}{P} \sum_{p=1...P} V_p, \quad (1)$$

which is the arithmetic average of the channel spectrograms 205 for all channels, P being the number of channels.

The estimation unit 212 is adapted to estimate the binary mask 213 in that the element $V'_{ij}$ of the binary mask 213 is defined according to the following equation (2):

$$V'_{ij} = \begin{cases} 1, & \psi_{ij} > \tau V_{ij}, \\ 0, & \text{otherwise} \end{cases} \quad i = 1, \ldots N, j = 1, \ldots F. \quad (2)$$

wherein

ψ is the identified separated source signal 211,

τ is a threshold, and

V is the averaged channel spectrogram 207.

In equation (2), V' denotes the matrix defining the binary mask and $V_{ij}$ denotes the entry in i-th row and j-th column of the matrix V defining the averaged channel spectrogram 207.

The threshold τ may be a variable value, wherein 0<τ<1. Advantageously, the value of the threshold may be comprised between 0.3 and 0.5. In block-based processing, such as real-time processing, there are only a few frames which can be analyzed together. It is proposed to select τ>0.3 to guarantee that there is enough information for the localization. It is not necessary for the specified source to be predominant. Accordingly, it is proposed to set the threshold τ not higher than 0.5, otherwise there would be too much useful information wasted.

Figure 4:
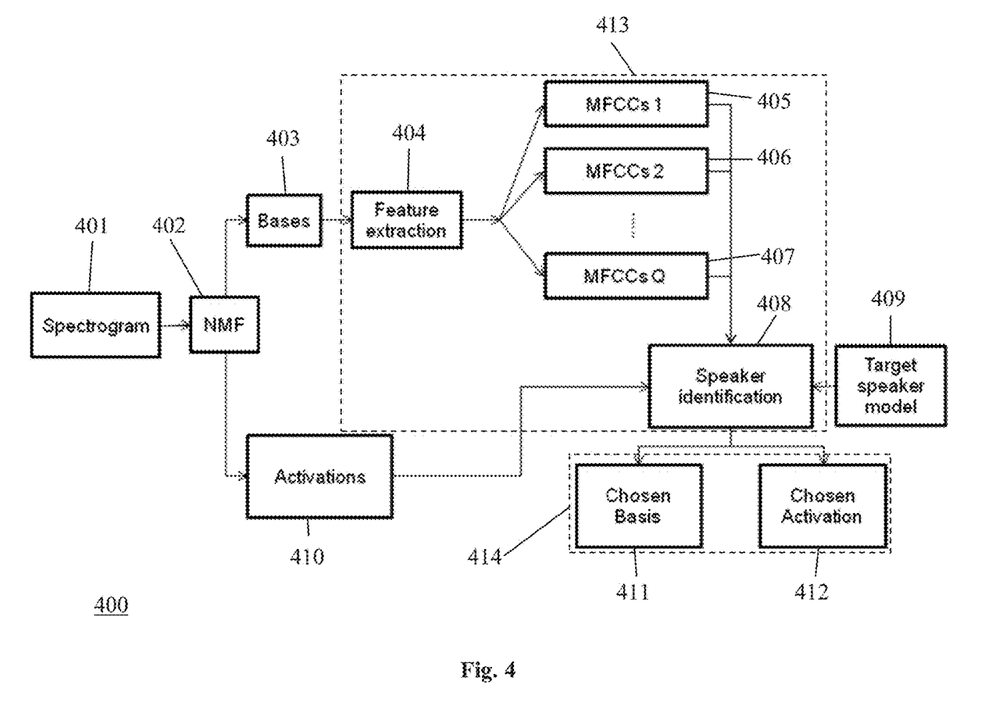
FIG. 4 shows a section of an apparatus for localizing a target sound source according to an embodiment of the present disclosure.

FIG. 4 shows a section 400 of an apparatus for localizing a target sound source according to an embodiment of the present disclosure.

Reference 401 corresponds to the averaged channel spectrogram 207 of FIG. 2. Further, the blind source separation unit 208 of FIG. 2 is in the form of a non-negative matrix factorization, NMF, unit 402. The NMF unit 402 is adapted to blindly separate the averaged channel spectrogram 401 to obtain a plurality of separated source signals. The NMF unit 402 carries out the blind separation by factorizing the averaged channel spectrogram 401 by means of an NMF into bases 403 and activations 410, the bases 403 and activations 410 corresponding to the separated source signals.

Alternatively, the input of the NMF unit 402 may also be the channel spectrograms 205, such that the NMF unit 402 may factorize the channel spectrograms 205 into bases 403 and activations 410.

To analyze the source's frequency and activation properties, the NMF unit 402 factorizes the nonnegative matrix V of the averaged channel spectrogram 207 into two nonnegative matrices W and H according to the following equation (3):

$$V = WH \quad (3)$$

wherein W is a basis matrix, and H is an activation matrix.

It is assumed that the matrix V of the averaged channel spectrogram 207 has a dimension N*F, and that the dimension of the factorization is r. After the factorization, W is an N*r basis matrix, and H is an r*F activation matrix. The factorization value r may be chosen as being r=Q, wherein Q corresponds to the number of active sound audio sources or to the estimated number of active sound sources.

The NMF may be implemented in different ways, as known from the prior art. For example, if the sound source is speech, it is possible to use the NMF implementation proposed in Daniel D. Lee and H. Sebastian Seung "Algorithms for non-negative matrix factorization", In NIPS, pages 556-562, 2000. To approximate the factorization of equation (3), the latter NMF implementation defines the following cost function according to equation (4) to minimize the distance between V and WH:

$$D(A||B) = \sum_{i,j} A_{ij} \log \frac{A_{ij}}{B_{ij}} - A_{ij} + B_{ij} \quad (4)$$

As mentioned above, the dimension r of the factorization is equal to the number of active sources Q. The rows of the factorized matrix W are the spectral features of each source, and the columns of matrix H are their activations.

The matrices W and H may be computed with iterative update rules, so as to make sure that the distance D is minimized. It is suggested to use for example the multiplicative update rules for divergence distance, as mentioned in Daniel D. Lee and H. Sebastian Seung "Algorithms for non-negative matrix factorization", In NIPS, pages 556-562, 2000. The number of iterations may be set to a maximum of 200.

The choice of using NMF for blind source separation 208 is not mandatory for the disclosure. Instead, other blind source separation methods may be used, for example, using subspace analysis or Independent Subspace Analysis, ISA. ISA is a known method for separating individual audio sources from a single-channel mixture, and is, e.g., described in Casey, Michael A., and Alex Westner. "Separation of mixed audio sources by independent subspace analysis", Proceedings of the International Computer Music Conference, 2000.

With reference to FIG. 4, the NMF unit 402 is adapted to carry out a blind separation so as to obtain separated source signals 209 in form of bases 403 and activations 410, each basis being defined by a column of the matrix W and each activation being defined by a row of the matrix H.

Reference 413 of FIG. 4 defines an identification unit and corresponds to the identification unit 210 of FIG. 2. After the factorization of the spectrum to basis and activation matrices by means of the NMF unit 402, the identification unit 413 is responsible for choosing the basis which is most related to the target source model.

The identification unit 413 comprises an extraction unit 404 adapted to extract audio features 405, 406, 407 from each of the separated source signals, for example from each of the bases 403. The identification unit 413 also comprises a sub-identification unit 408 adapted to identify, from among the separated source signals, the separated source signal corresponding to the audio features 405, 406, 407 that best match the target source model 409.

The extracted audio features 405, 406, 407 are for example MFCCs. The MFCC features are extracted for each of the separated Q bases, and, using the trained target source model 409, the basis corresponding to the target sound source 102, also identified by the reference s, is found by the sub-identification unit 408 by means of for example maximum-likelihood classification.

Maximum-likelihood classification describes the process where for each of the feature vectors, the generation probability of the target source model 409 is evaluated, and the feature vector is chosen which delivers the highest generation probability. In case of a distance-based classifier, e.g. nearest neighbor, it is proposed to use a minimum-distance classification instead of maximum-likelihood classification for identifying the basis s.

In general, the basis 411 that is chosen or identified by the identification unit 413 is the basis that is most similar to the training data of the target sound source or target speaker, which are represented by the target source model 409. Audio features 405, 406, 407 are the extracted features of the Q different extracted bases and represent respectively one of the sound sources in the recording signal. Finding the basis that best matches the target sound source is a classical pattern recognition problem. Solutions to this problem generally extract some features 405, 406, 407 using the feature extraction unit 404 from the raw signal 403. The target sound source is represented by the target source model 409 and the goal of the pattern recognition method is to identify the sound source or speaker. The present disclosure thus proposes to carry out a pattern recognition so as to select the features among the extracted features 405, 406, 407 that give the best match to the target source model 409.

As each basis maps to an activation vector, the identification unit 413, i.e., the sub-identification unit 408 chooses the activation vector 412 that belongs to the chosen basis 411. It is proposed to take the column vector $W_s$ and the row vector $H_s$ as the chosen basis and activation vector. The chosen basis vector 411 and activation vector 412 are referred to by the numeral 414 and correspond to the identified separated source signal 211 of the general embodiment of FIG. 2.

With reference to FIG. 2, the identified separated source signal 211 is used by the estimation unit 212 to generate the binary mask 213. In this respect, the blind source separation is performed by the blind source separation unit 208 on a monaural mixture of all microphone signals, said monaural mixture corresponding to the averaged channel spectrogram 207. In the following, an approach to estimate the binary mask 213 that is applied on the original microphone signals, i.e. on the channel spectrograms 214, will be presented, especially with regard to the embodiment of FIG. 4 with the identified separated source signal 211 being the chosen basis and vector 414.

The main purpose of the estimation unit 212 is to find when and at which frequencies the specified target sound source 102 is active, so it is proposed to choose elements from the channel spectrograms 214 based on the identified separated source signal 211, i.e. based on the chosen basis and activations 414, using the binary mask 213.

The chosen basis 411 is a description of the spectral properties of the specified target sound source 102. The basis which is closest to the specified target sound source has been identified by the identification unit, and therefore, the frequency band energy of the specified target sound source 102 is positively correlated to the amplitude distribution in the chosen basis.

The chosen activation 412 vector reflects how the energies of the chosen basis are distributed in frames. It is proposed to define an energy coefficient Ψ, which is an N*F matrix, in time-frequency domain, and its entry $\psi_{ij}$ in $i_{th}$ row and $j_{th}$ column denotes the energy of the basis in $i_{th}$ frequency band and $j_{th}$ time frame. The variable Ψ can be regarded as the reconstruction of the target source, and is defined according to the following equation:

$$\psi = W_s * H_s \qquad (5)$$

wherein the column vector $W_s$ and the row vector $H_s$ correspond to the chosen basis and activation vector 414.

The binary mask 213 is used to choose elements in the averaged channel spectrogram 207, V. This binary mask is defined by the above-mentioned equation (2).

The selected spectrogram in $p_{th}$ channel is $V'_p$, which is defined in the following equation (6):

$$V'_p = V_p \circ V' \qquad (6)$$

wherein $\circ$ denotes a Schur Product, and $V_p$ corresponds to the channel spectrograms 214.

The above-mentioned equation (2) defines the binary mask 213. In this respect, there are two reasons for using a binary mask instead of a soft mask in the equation (2). Firstly, it is proposed to factorize the averaged channel spectrogram 207, and the energy of the target sound source is not uniformly distributed in each channel. Therefore it is not possible to apply the same soft mask to all channels. Secondly, applying a soft mask or a Wiener filter corresponds to an amplitude modification, which leaves the phase unchanged and thus does not improve the eigenvalue energy distribution in the subsequent localization step. The application of a Wiener filter is e.g. proposed in the document Spriet, Ann, Marc Moonen, and Jan Wouters, "Spatially pre-processed speech distortion weighted multi-channel Wiener filtering for noise reduction" *Signal Processing* 84.12 (2004): 2367-2387, or in the document Cho, Hyungi, JongSuk Choi, and Hanseok Ko, "Robust sound source localization using a Wiener filter" *Emerging Technologies & Factory Automation (ETFA), 2013 IEEE 18th Conference on*, IEEE, 2013.

Figure 5:
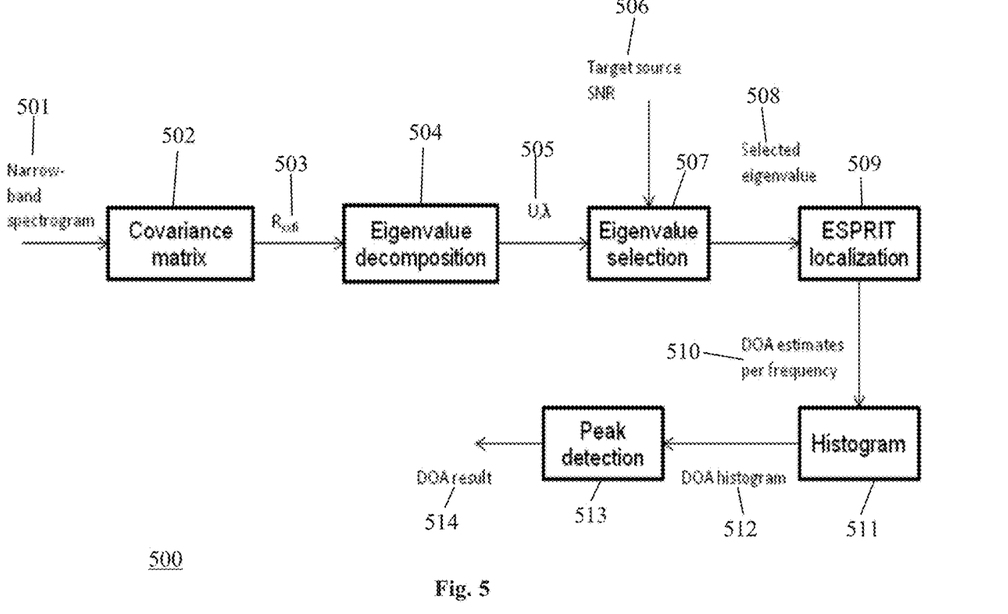
FIG. 5 shows a section of a localization unit of an apparatus for localizing a target sound source according to an embodiment of the present disclosure.

FIG. 5 shows a section of a localization unit of an apparatus for localizing a target sound source according to an embodiment of the present disclosure. For example, FIG. 5 may show a section of the localization unit 216 of FIG. 2.

The localization unit 216 comprises a separation unit (not shown) adapted to separate the masked channel spectrograms 221, $V'_p$ into narrow frequency bands $f_i$, and each masked channel spectrogram 221, $V'_p$ into corresponding narrow band channel spectrograms $V'_{pfi}$.

In a preferred embodiment, the ESPRIT algorithm is used for the DOA estimation. The ESPRIT algorithm is a known algorithm and is, e.g., presented in the document R. Roy and T. Kailath, "Esprit-estimation of signal parameters via rotational invariance techniques", Acoustics, Speech and Signal Processing, IEEE Transactions, 37(7):984-995, July 1989. The ESPRIT algorithm was designed for narrow band signals and can estimate DOA from the multi-channel signal matrix directly in time domain. However, the signals of the present disclosure are broadband signals, so it is proposed to transform the signal into frequency domain and then for example run the ESPRIT algorithm in each narrow band.

The localization unit 216 further comprises a computing unit adapted to, for each narrow frequency band $f_i$, compute 502 a covariance 503, $R_{xxfi}$ of a narrow band spectrogram 501, $V'_{f_i}$ comprising the narrow band channel spectrograms $V'_{pfi}$ of all channels.

Particularly, in the original unmodified version of the ESPRIT algorithm as described in the above-mentioned document by Roy et al., in the first step the covariance $R_{xx}$ of the original signal matrix x is computed according to following equation (7):

$$R_{xx} = x * x^T \quad (7)$$

wherein the signal matrix x contains the time-domain signals from all microphone channels, i.e. x corresponds to the multi-channel recording signal 201.

In the present disclosure, it is proposed to take narrow bands in frequency domain 501 to compute 502 the covariance $R_{xxfi}$ 503 according to following equation (8):

$$R_{xxfi} = V'_{f_i} * V'^T_{f_i} \quad (8)$$

wherein $f_i$ denotes the $i_{th}$ frequency band, and $V'_{f_i}$ denotes the selected narrow band spectrogram 501 with all the channels together according to following equation (9):

$$V'_{f_i} = \begin{bmatrix} V'_{1f_i} \\ V'_{2f_i} \\ \vdots \\ V'_{Pf_i} \end{bmatrix} \quad (9)$$

wherein for example $V'_{2f_i}$ denotes one frequency band of the matrix $V'_{f_i}$, i.e. a row vector corresponding to the $i_{th}$ frequency band. The averaged covariance matrix through each frequency band is equivalent to $R_{xx}$ according to following equation (10), wherein $\overline{\{*\}}$ denotes the operation of arithmetic average:

$$R_{xx} = \overline{\Sigma_{i=1}^F R_{xxfi}} \quad (10)$$

According to the present disclosure, the computing unit of the localization unit 216 is further adapted to, for each narrow frequency band $f_i$, decompose 504 the covariance 503, $R_{xxfi}$ into its eigenvalues 505, $\lambda$ and eigenvectors 505, U.

Particularly, in the conventional ESPRIT algorithm, the second step is to decompose the covariance matrix $R_{xxfi}$ into its eigenvalues and eigenvectors, according to following equation 11, wherein U denotes an eigenvector matrix, and $\lambda$ denotes an eigenvalue diagonal matrix. Then the conventional ESPRIT algorithm takes the eigenvectors with first highest Q (source number) eigenvalues into further processing.

$$R_{xxfi} U = \lambda U \quad (11)$$

Since however it is proposed by the present disclosure to set the threshold parameter $\tau \in [0.3, 0.5)$, the eigenvector of the specified target sound source doesn't always have the highest eigenvalue. Thus, after the decomposition according to equation (11), the disclosure proposes to take only one eigenvector with the highest relationship to the specified target sound source. In the following we describe how the process of choosing 507 the correct eigenvector is done according to the disclosure.

According to the present disclosure, the computing unit of the localization unit 216 is further adapted to
  compute the energy $E_m$ of each eigenvalue, the sum E of the energy $E_m$ of all eigenvalues, and the corresponding energy ratio $\delta'_m$ of each eigenvalue
  estimate the averaged signal-to-noise ratio, SNR, $\delta_{f_i}$ through all frames in said narrow frequency band $f_i$ of the averaged spectrogram 207, V, and
  choose 507, from among all eigenvalues 505, $\lambda$, the eigenvalue 508 that has the energy ratio $\delta'_m$ that is the most similar to the averaged SNR $\delta_{f_i}$.

Particularly, it is proposed to estimate the SNR 506 in this narrow band signal according to following equation (12), wherein $\delta_{f_i}$ denotes the averaged SNR through frames in the $i_{th}$ frequency band of the averaged channel spectrogram V, 207. The SNR is defined as the ratio of the energy of the specified speaker to the full energy.

Particularly, it is also proposed to compute the energy $E_m$ in $m_{th}$ eigenvalue according to following equation (13), where P denotes the number of microphones in the array, the sum of the eigenvectors' energy is E, and $\delta'_m$ is the energy ratio for $m_{th}$ eigenvector as defined in following equation (14). The eigenvector $U_s$ is then chosen 507 by the eigenvalue that has the similar energy ratio $\delta'_m$ to the SNR $\delta_{f_i}$ according to following equation (15).

$$\delta_{f_i} = \overline{\sum_{j=1}^{F} \frac{\Psi_{ij}}{V_{ij}}} \quad (12)$$

$$E_m = |\lambda_{mm}| \quad (13)$$

$$E = \sum_{n=1}^{P} E_m,$$

$$m = 1, \ldots, P.$$

$$\delta'_m = \frac{E_m}{E} \quad (14)$$

$$U_s = \left\{ U_m \mid \min_m |\delta'_m - \delta_{f_i}| \right\} \quad (15)$$

In other words, the unit 507 chooses the eigenvector. Since eigenvalues are tied to their corresponding eigenvector, the unit 507 also chooses one specific eigenvalue corresponding to the chosen eigenvector. The chosen or selected eigenvalue is the output of unit 507 in FIG. 5.

With the chosen eigenvector $U_s$ or eigenvalue, the following process is exactly the same as in the conventional ESPRIT algorithm according to the above-mentioned document by Roy et al.

According to the disclosure, the localization unit 216 comprises an ESPRIT localization unit 509 adapted to localize the target sound source 102 from the plurality of sound sources 102, 103, 104 based on the chosen eigenvalue 508 by means of an ESPRIT algorithm.

Particularly, the ESPRIT localization unit 509 is adapted to estimate a localization 510 of the target sound source 102 for each narrow frequency band $f_i$, the estimated corresponding to the DOA. The computing unit is adapted to collect 511 the estimated localizations 510 in a histogram 512 and to localize the target sound source 102 by means of a peak detection 513 on the histogram 512. In order to obtain one localization result 514 per frame, the results for all frequencies are collected in the histogram 512, and a peak detection method 513 is applied on the histogram.

Figure 6:
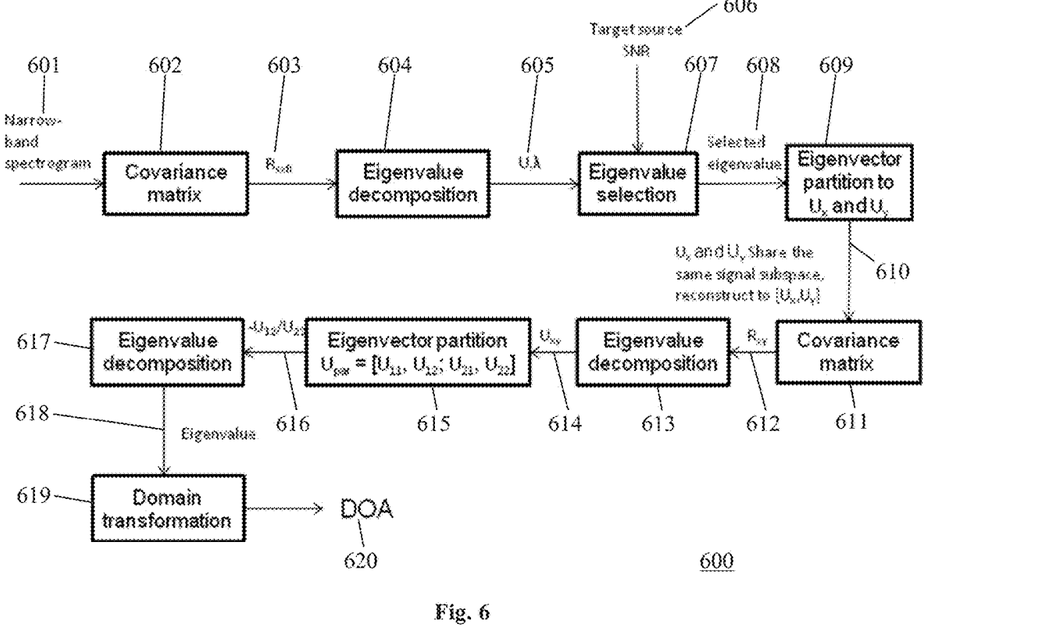
FIG. 6 shows a section of a localization unit of an apparatus for localizing a target sound source according to a further embodiment of the present disclosure.

FIG. 6 shows a section of a localization unit of an apparatus for localizing a target sound source according to an embodiment of the present disclosure. For example, FIG. 5 may show a section of the localization unit 216 of FIG. 2.

References 601 to 608 of FIG. 6 correspond to references 501 to 508 of FIG. 5. Accordingly, the unit 607 chooses or selects an eigenvector $U_s$. This eigenvector $U_s$ may be outputted by the unit 607 together with the corresponding chosen or selected eigenvalue 608.

Unit 609 is adapted to perform an eigenvector partition to $U_x$ and $U_y$ 610 according to following equations (16):

$$U_x = U_s(1:\text{end}-1)$$

$$U_y = U_s(2:\text{end}) \tag{16}$$

With P defining the number of channels, the selected eigenvector can be written as $U_s = [u_1, u_2, \ldots, u_P]$. The eigenvector partition $U_x$ then contains the first P−1 elements, and $U_y$ the last P−1 elements of the selected eigenvector.

Unit 611 is adapted to compute a covariance matrix from the eigenvector partitions $U_x$ and $U_y$ 610. The unit 611 in fact reconstructs the partitioned eigenvector and computes its covariance matrix. The computed covariance matrix may be defined according to the following equation:

$$R_{xy} = \begin{bmatrix} U_x \\ U_y \end{bmatrix} [U_x \quad U_y] \tag{17}$$

Unit 613 is adapted to perform an eigenvalue decomposition of the computed covariance matrix. The eigenvalue decomposition of the covariance matrix $R_{xy}$ is done according to the following equation, wherein $\lambda$ is the eigenvalue and $U_{xy}$ is the eigenvector:

$$R_{xy} U_{xy} = \lambda U_{xy} \tag{18}$$

Unit 615 is adapted to perform an eigenvector partition of the eigenvector $U_{xy}$ obtained by unit 613. Particularly, the eigenvector partition consists in equally separating the matrix $U_{xy}$ into four matrices, and finding the parameter $\Psi$ as defined in the following equations (19). The eigenvector partition may be equivalent to a total least square process. The parameter $\Psi$ corresponds to the output 616 of the unit 615.

$$U_{xy} \stackrel{\text{def}}{=} \begin{bmatrix} U_{11} & U_{12} \\ U_{21} & U_{22} \end{bmatrix} \tag{19}$$

$$\Psi = -\frac{U_{12}}{U_{22}}$$

Next unit 617 is adapted to carry out an eigenvalue decomposition of the parameter $\Psi$ so as to obtain an eigenvalue $\hat{\Phi}$ corresponding to the output of unit 617. The eigenvalue decomposition is done according to the following equation (20):

$$\hat{\Phi} = \lambda \Psi \tag{20}$$

Unit 619 is adapted to carry out a domain transformation so as to obtain an DOA based on the obtained eigenvalue $\hat{\Phi}$. Particularly, the domain transformation may be done according to the following equation (21):

$$\Theta = \sin^{-1}\left\{ c \arg \frac{\hat{\Phi}}{\omega \Delta d} \right\} \tag{21}$$

wherein
- c is the transmission speed of the signals from the sound sources 102, 103, 104,
- $\omega = 2\pi f$ is the angular frequency, f being the frequency of the input signal i.e. f corresponding to the narrow frequency bands $f_i$,
- $\Delta d$ is the distance between microphones, and
- $\Theta$ is the DOA result.

This particular equation is applicable e.g. in cases where the microphones are linearly distributed, so that the value $\Delta d$ may be determined.

Although the embodiments of FIGS. 5 and 6 are based on an ESPRIT method for source localization, the disclosure also comprises further embodiments using other known localization methods. This means that the localization unit 216 may use other known localization methods for localizing the target sound source 102. Such other known methods may also, instead of DOA estimation, have other targets, such as TDOA estimation for example.

The localization carried out by the localization unit 216 based on the masked channel spectrograms 221 may be based, see FIGS. 5 and 6, on the ESPRIT method according to, e.g., the document R. Roy and T. Kailath, "Esprit-estimation of signal parameters via rotational invariance techniques", Acoustics, Speech and Signal Processing, IEEE Transactions, 37(7):984-995, July 1989. Alternatively, the localization unit 216 may implement other known localization algorithms. Examples of other such known localization algorithms can be taken from the following documents:

R. O. Schmidt. Multiple emitter location and signal parameter estimation. Antennas and Propagation, IEEE Transactions, 34(3):276-280, March 1986

Teutsch, H and Kellermann, W. EB-ESPRIT: 2D localization of multiple wideband acoustic sources using eigenbeams, Acoustics, Speech, and Signal Processing, 2005. Proceedings. (ICASSP '05). IEEE International Conference, 3:89-92, March 2005

C. Knapp and G. Cliord Carter. The generalized correlation method for estimation of time delay. Acoustics, Speech and Signal Processing, IEEE Transactions, 24:320-327, August 1976

Joseph Hector DiBiase. A High-Accuracy, Low-Latency Technique for Talker Localization in Reverberant Environments Using Microphone Arrays. PhD thesis, Brown University, May 2000

The choice of using NMF for blind source separation 208 is not mandatory for the disclosure. Instead, other blind source separation methods may be used, for example, using subspace analysis or Independent Subspace Analysis, ISA. Subspace analysis is another possible method for carrying out the source separation. Such a method also generates separated sources signals 209, and the separation result would correspond to the reconstruction $\psi$ in equation (5), rather than bases and activations. The identification unit 210 then does not use the basis, i.e. does not use one part of the separated source signals, for comparing with the speaker model 220, but uses the "full" separated source signals 209.

In other words, the main difference between NMF and other blind source separation methods is that NMF produces bases and activations, which can be combined with equation (5) to get the separated source signals 209, whereas other methods directly create those separated source signals 209.

Figure 7:
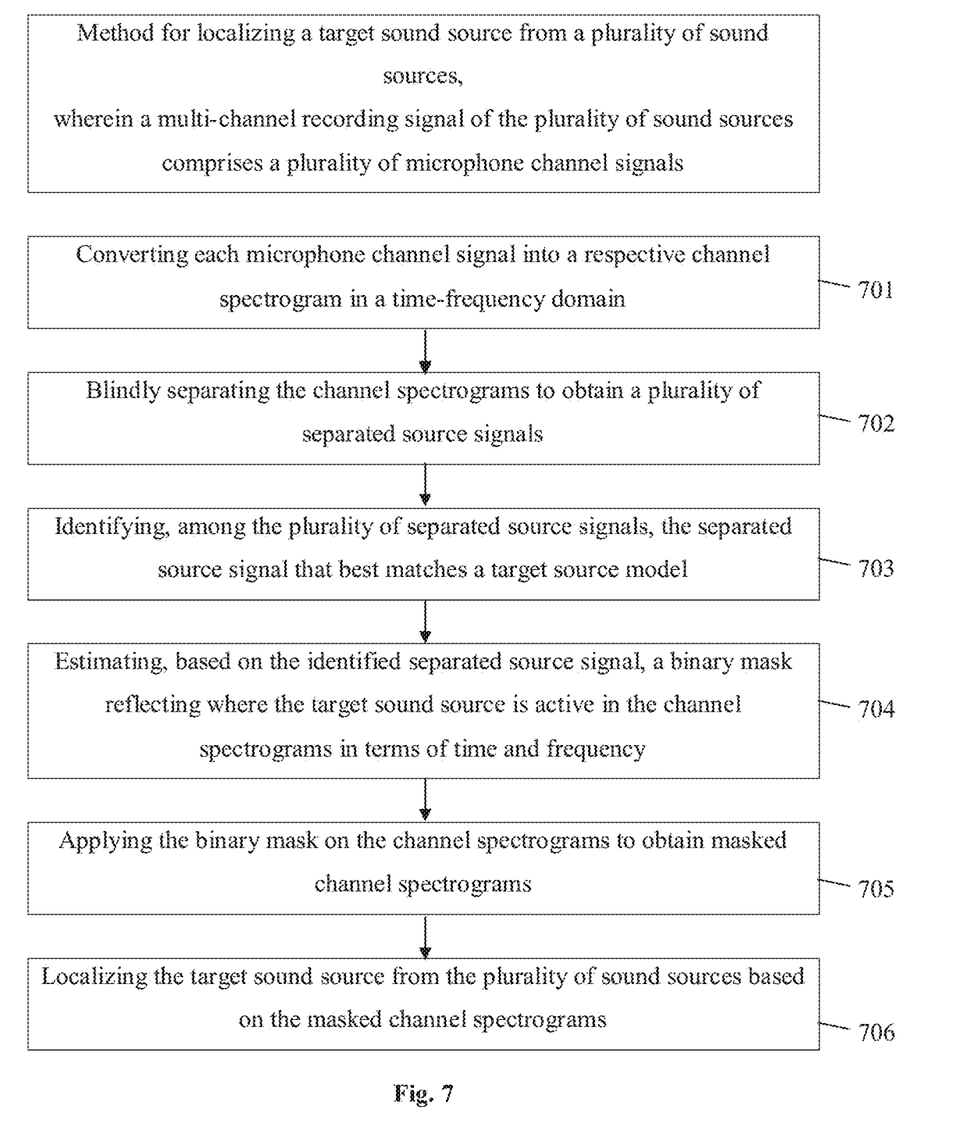
FIG. 7 shows a method for localizing a target sound source according to an embodiment of the present disclosure.

FIG. 7 shows a method 700 for localizing a target sound source according to an embodiment of the present disclosure. The method 700 is adapted to localize a target sound source 102 from a plurality of sound sources 102, 103, 104, wherein a multi-channel recording signal 201 of the plurality of sound sources 102, 103, 104 comprises a plurality of microphone channel signals 201a, 201b, 201c.

The method comprises converting 701 each microphone channel signal 201a, 201b, 201c into a respective channel spectrogram 205, 214, $V_p$ in a time-frequency domain.

The method comprises blindly separating 702 the channel spectrograms 205 to obtain a plurality of separated source signals 209, 403, 410.

The method comprises identifying 703, among the plurality of separated source signals 209, 403, 410, the separated source signal 211, $\Psi$, 411, 412 that best matches a target source model 220, 307, 409.

The method comprises estimating 704, based on the identified separated source signal 211, $\psi$, 411, 412, a binary mask 213, V' reflecting where the target sound source 102 is active in the channel spectrograms 214, $V_p$ in terms of time and frequency.

The method comprises applying 705 the binary mask 213, V' on the channel spectrograms 214, $V_p$ to obtain masked channel spectrograms 221, $V'_p$.

The method comprises localizing 706 the target sound source 102 from the plurality of sound sources 102, 103, 104 based on the masked channel spectrograms 221, $V'_p$.

Figure 8:
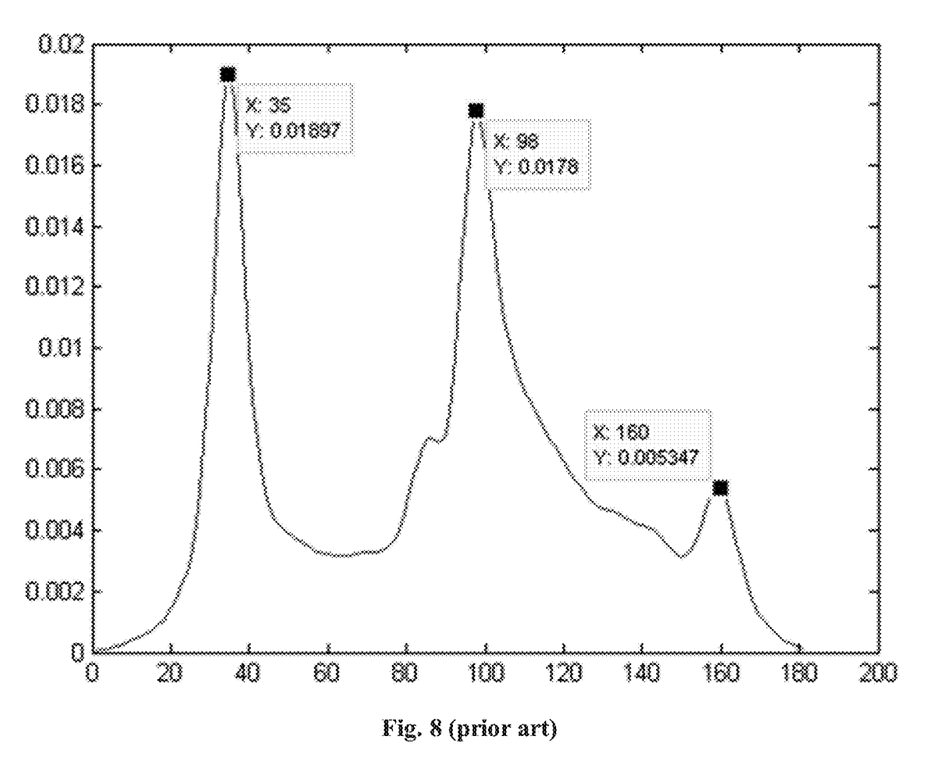
FIG. 8 shows a histogram for localizing a target sound source according to the prior art.

FIG. 8 shows a histogram for localizing a target sound source according to the prior art, and particularly according the conventional ESPRIT algorithm defined in the above-mentioned document by Roy et al.

Figure 9:
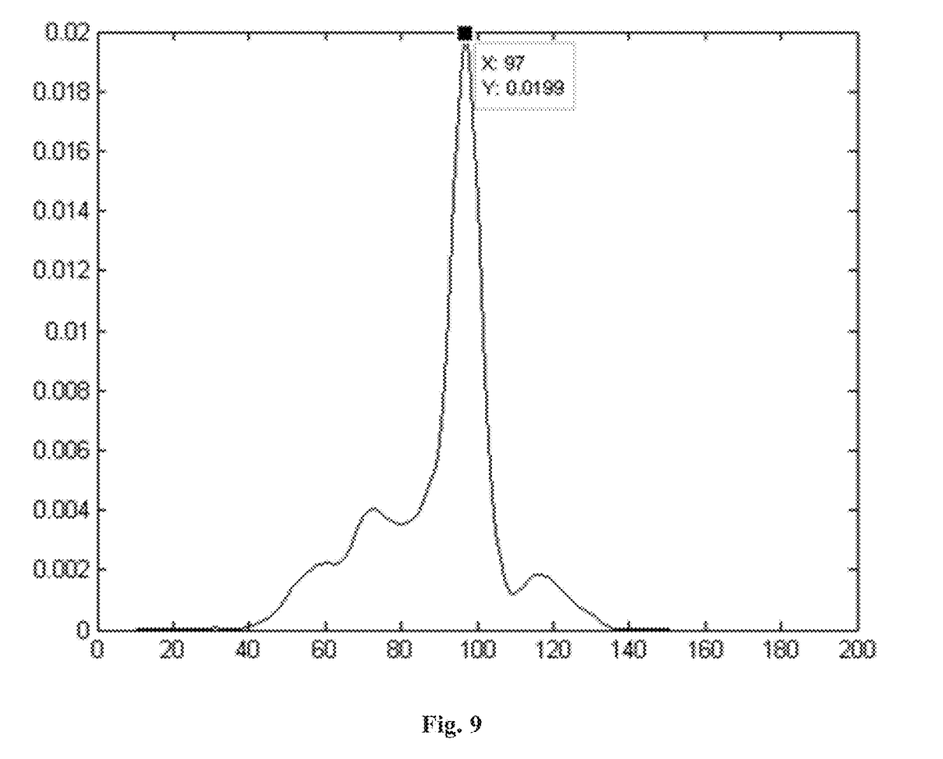
FIG. 9 shows a histogram for localizing a target sound source according to an embodiment of the present disclosure.

FIG. 9 shows a histogram for localizing a target sound source according to the present disclosure.

The histogram of FIGS. 8 and 9 show the probability distribution for the localization of the target sound source 102, i.e., the probability distribution for each possible DOA. The processing is performed with a block length of 1 second, sampling frequency is 44100, N in STFT is 4096 and hop size is 2048.

The histogram of FIG. 8 according to the prior art comprises several peaks corresponding to the target sound source 102 as well as to the competing sound sources 103, 104. As may be taken from FIG. 9, the DOA results of the competing signals are clearly attenuated by the present disclosure, so by a simple Peak Detection method, the DOA of the target sound source 102 may be found more easily than in the prior art histogram comprising several peaks.

To summarize, the disclosure is built for a scenario with multiple sound sources, and uses microphone array(s) 101 to localize a target sound source 102. The goal of the disclosure is to localize the target sound source 102 with known statistics within a multi-source environment 102, 103, 104. The algorithm is a pre-processing step of localization algorithms implemented in the localization unit 216. The pre-processing step of the disclosure consists in finding where and when the target sound source signal is emphasized in frequency and activation. A blind source separation method 208 is employed to separate the input signal into the contributing signals 209, and a comparison of the separated signals 209 with the trained model 220 of the specified target signal 218 reveals the information about time-frequency bins where the specified source is active. A binary mask 213 is estimated using the separated signals 209 and the identification result 211, in order to retain only the information of the target sound source 102 in the original microphone signals 201. The filtered signals 221 are processed with a conventional localization algorithm 216, wherein e.g. an eigenvalue 508 may be selected, such that only the target sound source 102 is localized.

So after the further processing of the localization algorithm, the DOA/TDOA estimation result 217 will be more emphasized with respect to prior art localization.

The motivation for the disclosure is that with most conventional localization methods, underdetermined localization problems, occurring when the number of microphones is smaller than the number of sources, cannot be solved. The present disclosure circumvents this problem. A method for underdetermined source separation, e.g. NMF, is used to process the original signals by estimating and applying a binary mask 213. This reduces the problem to an overdetermined source localization problem, where only one specified target source is localized.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. An apparatus for localizing a target sound source from a plurality of sound sources, wherein a multi-channel recording signal of the plurality of sound sources comprises a plurality of microphone channel signals, the apparatus comprising a computing device and a non-transitory computer-readable medium having program code stored thereon, the program code including a plurality of units, the units including:
    a block segmentation unit adapted to segment the plurality of microphone channel signals into blocks,
    a converting unit adapted to convert each microphone channel signal of the plurality of microphone channel signals into a respective channel spectrogram in a time-frequency domain by converting each block into the respective channel spectrogram using a short-time Fourier transform, STFT,
    an averaging unit adapted to average the channel spectrograms into an averaged channel spectrogram,
    a blind source separation unit adapted to blindly separate the averaged channel spectrogram to obtain a plurality of separated source signals,
    an identification unit adapted to identify, among the plurality of separated source signals, an identified separated source signal that best matches a target source model,
    an estimation unit adapted to estimate, based on the identified separated source signal, a binary mask reflecting where the target sound source is active in the channel spectrograms in terms of time and frequency, wherein an element $V'_{ij}$ of the binary mask is defined as:

$$V'_{ij} = \begin{cases} 1, & \psi_{ij} > \tau V_{ij}, \\ 0, & \text{otherwise.} \end{cases} \quad i = 1, \ldots N, j = 1, \ldots F$$

wherein
N is a length of the STFT,
F is a number of frames comprised in each block,
$\psi$ is the identified separated source signal,
$\tau$ is a threshold, and
V is the averaged channel spectrogram,
a masking unit adapted to apply the binary mask on the channel spectrograms to obtain masked channel spectrograms, and
a localization unit adapted to localize the target sound source from the plurality of sound sources based on the masked channel spectrograms.

2. The apparatus according to claim 1,
wherein the target sound source is considered to be active in a given time-frequency slot of the channel spectrograms if its energy in the given time-frequency slot of the channel spectrograms is sufficiently large in relation to the total energy of the channel spectrograms.

3. The apparatus according to claim 1,
wherein the localization unit is adapted to localize the target sound source by localizing, from the plurality of sound sources, the sound source having a contribution in terms of energy to the plurality of sound sources in the masked channel spectrograms that is similar to the energy relation of the target sound source in relation to the total energy of the plurality of sound sources.

4. The apparatus according to claim 1,
wherein the localization unit comprises:
a separation unit adapted to separate the masked channel spectrograms into narrow frequency bands ($f_i$), and each masked channel spectrogram into corresponding narrow band channel spectrograms ($V'_{pfi}$),
a computing unit adapted to, for each narrow frequency band ($f_i$):
compute a covariance ($R_{xxfi}$) of a narrow band spectrogram ($V'_{fi}$) comprising the narrow band channel spectrograms ($V'_{pfi}$) of all channels,
decompose the covariance ($R_{xxfi}$) into its eigenvalues ($\lambda$) and eigenvectors (U),
compute the energy ($E_m$) of each eigenvalue, the sum (E) of the energy ($E_m$) of all eigenvalues, and the corresponding energy ratio ($\delta'_m$) of each eigenvalue,
estimate the averaged signal-to-noise ratio, SNR, ($\delta_{fi}$) through all frames in said narrow frequency band ($f_i$) of the averaged spectrogram (V), and
choose, from among all eigenvalues $\lambda$), the eigenvalue that has the energy ratio ($\delta'_m$) that is the most similar to the averaged SNR ($\delta_{fi}$), and
an ESPRIT localization unit adapted to localize the target sound source from the plurality of sound sources based on the chosen eigenvalue by means of an ESPRIT algorithm.

5. The apparatus according to claim 4,
wherein the ESPRIT localization unit is adapted to estimate a localization of the target sound source for each narrow frequency band ($f_i$),
wherein the computing unit is adapted to collect the estimated localizations in a histogram and to localize the target sound source by means of a peak detection on the histogram.

6. The apparatus according to claim 1,
wherein the identification unit adapted to identify, among the plurality of separated source signals, the identified separated source signal ($\psi$) that best matches the target source model comprises:
an extraction unit adapted to extract audio features from each of the separated source signals and
a sub-identification unit adapted to identify, from among the separated source signals, a separated source signal ($\Psi$) corresponding to audio features that best match the target source model.

7. The apparatus according to claim 1,
wherein the blind source separation unit is adapted to blindly separate the channel spectrograms to obtain a plurality of separated source signals, by:
factorizing the channel spectrograms by means of a non-negative matrix factorization, NMF, into bases (W) and activations (H), the bases (W) and activations (H) corresponding to the separated source signals.

8. The apparatus according to claim 7,
wherein the identification unit adapted to identify, among the plurality of separated source signals, a separated source signal ($\psi$) that best matches the target source model comprises:
an extraction unit adapted to extract audio features from each of the bases (W), and
a sub-identification unit adapted to identify, from among the bases (W), the basis ($W_s$) corresponding to the audio features that best match the target source model, and the activation ($H_s$) corresponding to the identified basis ($W_s$),
wherein the identified separated source signal is defined as $\psi = W_s * H_s$, $W_s$ and $H_s$ being respectively the identified basis and the identified activation.

9. The apparatus according to claim 1,
wherein the blind source separation unit is adapted to blindly separate the channel spectrograms to obtain a plurality of separated source signals by means of a subspace analysis.

10. The apparatus according to claim 1,
the computer program further comprising a training unit adapted to train the target source model based on at least one training recording signal of the target sound source,
wherein the training unit comprises:
an extraction unit adapted to extract audio features from the at least one training recording signal, and
a training unit adapted to train the target source model based on the extracted audio features.

11. A localization system comprising an apparatus according to claim 1, and
at least one microphone array for recording the multichannel recording signal,
wherein the localization unit of the apparatus is adapted to localize the target sound source by determining a direction of arrival, DOA, ($\Phi_2$) of the target sound source with respect to the at least one microphone array.

12. A method for localizing a target sound source from a plurality of sound sources, wherein a multi-channel recording signal of the plurality of sound sources comprises a plurality of microphone channel signals, the method comprising:

segmenting the plurality of microphone channel signals into blocks, converting each microphone channel signal of the plurality of microphone channel signals into a respective channel spectrogram ($V_p$) in a time-frequency domain by converting each block into the respective channel spectrogram using a short-time Fourier transform, STFT, averaging the channel spectrograms into an averaged channel spectrogram, blindly separating the averaged channel spectrogram to obtain a plurality of separated source signals, identifying, among the plurality of separated source signals, an identified separated source signal ($\Psi$) that best matches a target source model, estimating, based on the identified separated source signal ($\psi$), a binary mask (V') reflecting where the target sound source is active in the channel spectrograms ($V_p$) in terms of time and frequency, wherein an element $V'_{ij}$ of the binary mask is defined as:

$$V'_{ij} = \begin{cases} 1, & \psi_{ij} > \tau V_{ij}, \\ 0, & \text{otherwise.} \end{cases} \quad i = 1, \ldots N, \; j = 1, \ldots F$$

wherein

N is a length of the STFT,

F is a number of frames comprised in each block, $\psi$ is the identified separated source signal, $\tau$ is a threshold, and V is the averaged channel spectrogram, applying the binary mask (V') on the channel spectrograms ($V_p$) to obtain masked channel spectrograms ($V'_p$), localizing the target sound source from the plurality of sound sources based on the masked channel spectrograms ($V'_p$).

13. A non-transitory computer readable storage medium having stored thereon a program code for performing, when the computer program runs on a computing device, a method for localizing a target sound source from a plurality of sound sources, wherein a multi-channel recording signal of the plurality of sound sources comprises a plurality of microphone channel signals, the method comprising:

segmenting the plurality of microphone channel signals into blocks, converting each microphone channel signal into a respective channel spectrogram ($V_p$) in a time-frequency domain, by converting each block into the respective channel spectrogram using a short-time Fourier transform, STFT, averaging the channel spectrograms into an averaged channel spectrogram, blindly separating the averaged channel spectrogram to obtain a plurality of separated source signals, identifying, among the plurality of separated source signals, an identified separated source signal ($\Psi$) that best matches a target source model, estimating, based on the identified separated source signal ($\psi$), a binary mask (V') reflecting where the target sound source is active in the channel spectrograms ($V_p$) in terms of time and frequency, wherein an element $V'_{ij}$ of the binary mask is defined as:

wherein

N is a length of the STFT,

F is a number of frames comprised in each block, $\psi$ is the identified separated source signal, $\tau$ is a threshold, and V is the averaged channel spectrogram, applying the binary mask (V') on the channel spectrograms ($V_p$) to obtain masked channel spectrograms ($V'_p$), and localizing the target sound source from the plurality of sound sources based on the masked channel spectrograms ($V'_p$).

\* \* \* \* \*

UNITED STATES PATENT AND TRADEMARK OFFICE
CERTIFICATE OF CORRECTION

PATENT NO. : 10,901,063 B2
APPLICATION NO. : 16/014383
DATED : January 26, 2021
INVENTOR(S) : Helwani et al.

Page 1 of 1

It is certified that error appears in the above-identified patent and that said Letters Patent is hereby corrected as shown below:

On the Title Page

Page 2, item (56) Other Publications Citation Number 10: "Environment Using CSP Analysts" should be -- Environment Using CSP Analysis --.

In the Claims

Claim 4, Column 21, Line 57: "eigenvalues λ)" should read -- eigenvalues (λ) --.

Claim 13, Column 24, Line 25-26: "of the binary mask is defined as:" should read -- of the binary mask is defined as:

$$V'_{ij} = \begin{cases} 1, \psi_{ij} > \tau V_{ij}, \\ 0, \text{otherwise.} \end{cases} i = 1,...N, j = 1,...F$$

--.

Signed and Sealed this
Eighteenth Day of June, 2024

Katherine Kelly Vidal
*Director of the United States Patent and Trademark Office*